Patented Sept. 24, 1940

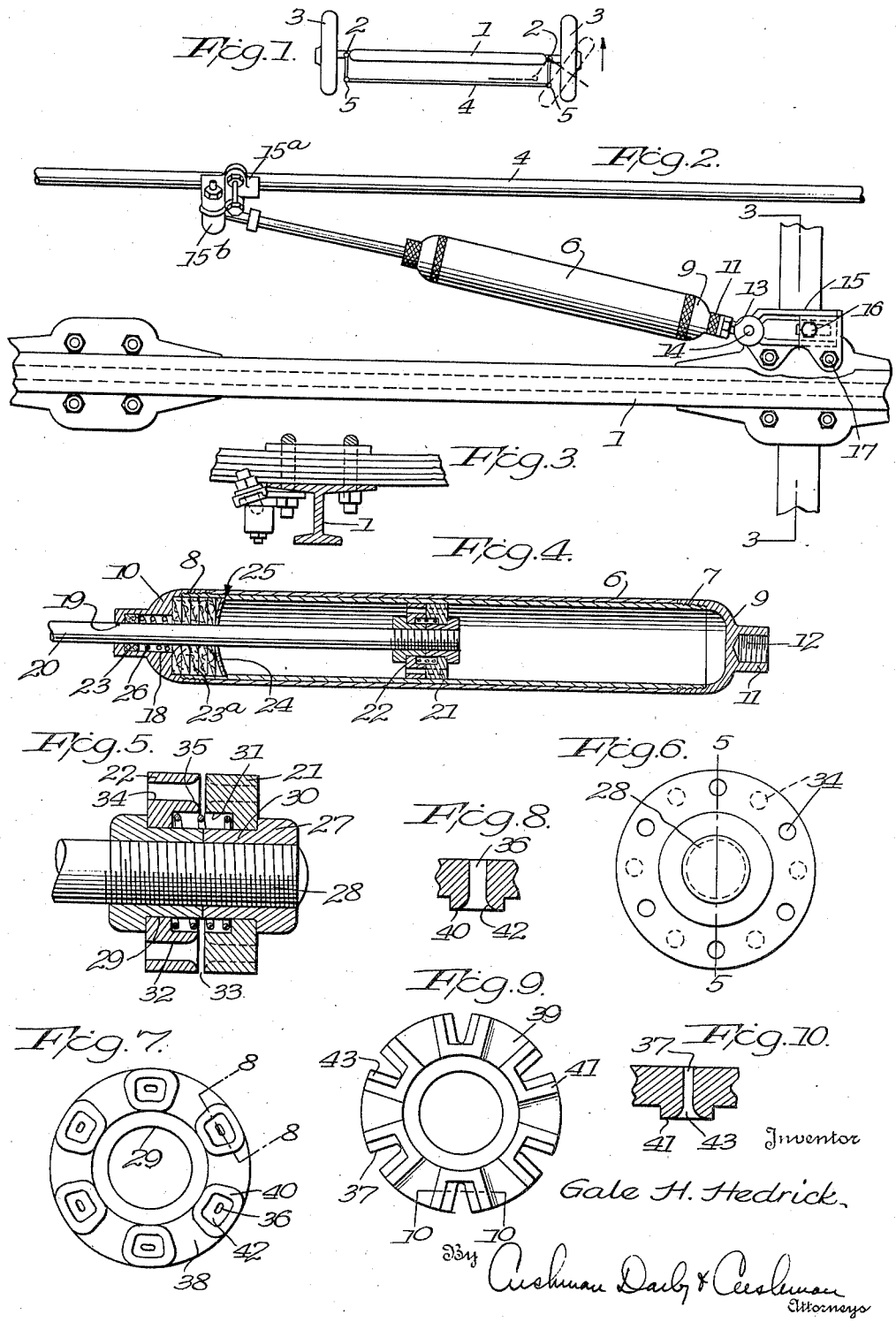

2,215,755

UNITED STATES PATENT OFFICE 2,215,755

STABILIZER

Gale H. Hedrick, Pittsburgh, Pa., assignor of one-half to I. A. Simon, Pittsburgh, Pa.

Original application June 26, 1936, Serial No. 87,580. Divided and this application October 15, 1938, Serial No. 235,705

1 Claim. (Cl. 280—90)

This invention relates to means for mechanically and automatically controlling the steering mechanism of road vehicles against accidental and sudden displacement and is a division of the Hedrick application, Serial No. 87,580, filed June 26, 1936, entitled Hydraulic hand. It is among the objects of this invention to provide such a device of simple and inexpensive construction adapted for ready attachment to the road vehicle, and which shall be adapted to prevent sudden displacement of the steering mechanism and also absorb the sudden shock and impact to which the steering mechanism is subjected when the wheels of the road vehicle pass over or strike obstructions in its path of travel.

A device suitable for the purpose may be termed a "hydraulic hand" consisting of a cylinder containing a viscous fluid such as oil, in which is disposed a leaky piston having slots or perforations to permit the retarded passage of fluid through the piston head. By attaching the cylinder to a stable element of the vehicle, such as the front wheel axle and the piston rod to the steering mechanism, the latter may be controlled to permit steering in the usual manner and without interference, and yet is capable of acting as a steering control device when the wheels to which the steering mechanism is attached are subjected to sudden shock or impact.

While it has been heretofore proposed to employ such fluid displacing means for controlling the steering mechanism of road vehicles, the present invention is directed to improvements, particularly in the control of the fluid displacement of such devices, that render such devices more efficient, more safe, and reliable in use.

The invention will become more apparent from a consideration of the accompanying drawing constituting a part hereof in which like reference characters designate like parts and in which:

Fig. 1 is a view diagrammatically illustrating the arrangement of a pair of vehicle wheels, axle and steering mechanism, and the effect of sudden shock or impact upon the wheels and steering device;

Fig. 2 a bottom plan view of a wheel axle and tie rod of the steering mechanism with the hydraulic hand attached thereto;

Fig. 3 a cross-sectional elevational view taken along the line 3—3, Fig. 2;

Fig. 4 a cross-sectional view of a fluid cylinder and piston element that is attached to the wheel axle and tie rod in the manner shown in Fig. 2;

Fig. 5 a cross-sectional view of an enlarged scale through the piston head of Fig. 4 taken on the line 5—5, Fig. 6;

Fig. 6 a front elevational view of the piston head or valve;

Fig. 7 a top plan view of a half section of the piston head;

Fig. 8 a cross-section of a fragmentary portion of the head of Fig. 7 taken along the line 8—8 thereof;

Fig. 9 a top plan view of a modified form of piston head;

Fig. 10 a cross-section of a fragmentary portion of the head of Fig. 9 taken along the line 10—10 thereof.

With reference to Fig. 1 of the drawing, the structure therein illustrated comprises a wheel axle 1 which is of the conventional I-beam type of axle for the front wheels of automotive vehicles; 2 the steering knuckles or king pins; 3 the vehicle wheels; 4 the tie rod; and 5 the tie rod joints.

The foregoing elements are of the conventional form. If the vehicle is travelling in the direction of the arrow and the tire on the right-hand side blows out or strikes an obstruction, the tendency is for the wheel to assume the position shown by the dotted lines. This results from the fact that the forward motion of the tire is suddenly retarded and the inertia of the vehicle tends to carry the axle unit forward, which causes the wheels to assume the position shown in Fig. 1.

Conditions such as those described are dangerous and often result in accidents as they come without warning and give the driver little or no opportunity to realize what has happened. By the time the human mind can react to the situation, the front wheels have assumed the position shown by the dotted lines in Fig. 1, and an accident has resulted. By attaching to the vehicle the hydraulic hand constructed in accordance with Figs. 4 to 10 of the drawing in the manner as shown in Fig. 2 of the drawing, the sudden swerving of the front wheels from any cause whatever is eliminated and the shocks ordinarily transmitted through the steering mechanism to the driver are absorbed.

The hydraulic hand will now be described in connection with Figs. 4 to 10 inclusive of the drawing, in which the numeral 6 designates a fluid cylinder having threaded ends 7 and 8 for interacting with the threads of caps 9 and 10, the cap 9 forming a closure and being provided with a boss 11 having a threaded interior 12 for receiving a threaded arm 13, Fig. 2, that is pivotally attached to the wheel axle 1 of the vehicle. The clamping bracket 15 is adjustable to adapt it to different size axles and is secured in position by a clamping bolt 16 and the spring bolts 17.

The end cap 10 of the fluid cylinder is provided with a counter-bore 18 and a central opening 19 for receiving a rod 20 of a pair of piston valve elements 21 and 22. The sliding joint for the rod 20 and opening 19 is packed against leakage by the employment of a wiper gland 23 and a plurality of laminated packing glands 23a which are held in place by a concave disc 24 that seats against a shoulder 25 in the cylinder 6 as shown in Figure 4 whereby the disc 24 is movable toward the packing. It will be noted that the disc 24 forms an end wall of a working chamber in the cylinder and acts to confine the packing. A coil spring 26 is disposed in the counterbore portion 18 of the end cap 10, one end of the spring abutting against one of the laminated packing glands 23.

The packing gland of the cylinder 6 is constructed of laminated members of compressible material e. g. synthetic rubber impregnated with graphite, the laminations functioning to prevent scoring of the piston rod 20 as any particles attempting to pass through the packing will be displaced into the laminated structure, and the laminations of the packing further function to receive oil between contiguous laminated members to aid in lubricating the piston rod joint.

The purpose of the concave washer 24 is to counteract the swelling, if any, of the glands 23a. Any swelling of the glands will tend to flatten washer 24, thereby increasing the pressure against the cylinder wall, i. e. the compressible gland material will spread laterally against the cylinder wall and about the periphery of the piston rod. Conversely, the confining means for the packing material, namely the disc 24 which is on the chamber side of the packing, is moved when said valve elements lock and are moved in the direction of the packing whereby the compressible material is compressed and expanded laterally to seal the chamber. In other words, swelling of the gland material will produce a tight seal about the cylinder wall and the piston rod and when the pressure in the chamber is toward the packing, the disc 24 will be bodily moved to compress the packing material against the cap 10 whereby it is caused to exert a similar sealing action of the chamber wall and the piston rod so as to prevent leakage of the hydraulic fluid. The function of the coil spring 26 is to maintain constant pressure upon the wiper gland 23 and the gland 23a, thus compensating for wear and maintaining the glands in proper position.

The piston or valve elements 21 and 22 are of a construction shown in Figs. 5 to 10 of the drawing and are mounted on flanged quill nuts 27, which in turn interact with threads 28 formed on the end of the piston rod as is clearly shown in Fig. 5 of the drawing. The valve elements 21 and 22 have an inner-bore 29 which is a sliding fit on the milled or cylindrical body portions 30 of the quill nuts 27. The elements 21 and 22 are also counter-bored at 31 to form a nest for a coil spring 32. The overall length of the cylindrical portions 30 of the quills 27 is slightly more than the aggregate width or thickness of valve elements 21 and 22, and the coil spring 32 separates the piston elements to provide a gap 33, the size of which is selected in accordance with the viscosity of the fluid in cylinder 6, and which, for commercial grades of lubricating oil, has been found to vary between .012" and .014". This construction enables the nuts to be threaded and locked in position on the piston rod with the opposed ends of their cylindrical portions in contact as shown since the flanges will then define a distance such that in cooperation with the spring 32, the normal gap between the valve elements may be precisely predetermined for the oil used and the steering structure to which the stabilizer is applied to give most effective operation, and this optimum control will be permanently maintained. Therefore the safety factor of the stabilizer in continuous operation is very substantially enhanced and once set at the factory, the valve cannot readily be manipulated to give an undesirable result.

In view of Fig. 6, valve elements 21 and 22 are provided with cylindrical openings 34, there being six shown on each of the elements, which are staggered and provide a tortuous path for the flow of the fluid through the valve from one side of the valve to the other. The staggered relationship of the cylindrical openings 34 is effective to accomplish the required valve action in cutting off the flow of fluid through the piston when a shock is encountered and the discs are forced together. As shown in Figure 5, the inner ends of the perforations are flared or rounded as shown at 35, to reduce the resistance to the flow through the flow passages 34. The valve elements, if desired, may be maintained relatively fixed against the rotation of one with respect to the other by any suitable means which, as explained, enables the valve elements to be free to reciprocate to effect the valve action.

In the modifications shown in Figs. 7 to 10 inclusive, elongated openings 36 or slots 37 may be employed instead of the cylindrical perforations 34 and the juxtaposed faces of the valve elements 21 and 22 may be depressed or cut-away as shown at 38, Fig. 7, and 39, Fig. 9, leaving the surfaces surrounding the perforations or slots 36 and 37 elevated as designated by the numerals 40 and 41, respectively. The ends of the perforations or slots of Figs. 7 and 9 are flared as shown at 42, Fig. 7, and 43, Fig. 9, and also as shown in Figs. 8 and 10, respectively. In these modifications when the valve elements are brought into abutting relation, a slight overlapping of the edge portions of the elevated surfaces 40 and 41 takes place such as will effectively bar the passage of fluid.

Again referring to Fig. 2 of the drawing, the piston rod 20 is attached to the tie rod 4 of a steering mechanism by means of a clamping unit 15a to which it is attached by a ball and socket or a universal joint assembly 15b.

The above-described mechanism operates briefly as follows:

The piston or valve elements 21 and 22 are movable on the quills 27 within the limits of the shoulders of the quills against which they abut in an amount equal to the gap 33, and are normally extended by the coil spring 32. The areas of the flow passages 34, 36 and 37, Figs. 6, 7 and 9, respectively, and the gap 33 are so proportioned that at normal rate of movement of the steering tie rod 4 and the corresponding movement of the valve elements 21 and 22 within the cylinder, no appreciable resistance to the passage of oil from one side of the piston to the other is encountered. However, a sudden shock or impact tending to accelerate the speed of travel of the valve elements 21 and 22 will increase the pressure on one of the elements, depending on the direction of travel, to cause it to move against the other valve element, thereby closing the gap 33. (The actual closing of the valve elements may be caused by the creation of a vacuum behind the piston upon sudden movement. Such vacuum would cause the fluid to flow from between the valve elements and permit the device to function in the manner herein disclosed. The purpose of the invention is to provide means to render the closing of the valve elements more rapid than has been possible in the past. Any force applied to the elements that will cause the fluid to be squeezed from between the elements will effect the purpose of the stabilizer and this force may be considered as caused by pressure on the forward element, or by the creation of a vacuum behind the piston element, or a combination of both actions.) The cylindrical openings 34 in the opposed valve elements are staggered and therefore when the gap 33 is closed no fluid can flow through the piston element and thus further travel of the piston element is prevented. The various forms of flow passage with their flared inner-ends as shown in Fig. 5, and the various forms of juxtaposed faces of the piston elements, as shown in Figs. 7 and 9, are designed to provide a better seal when the valves are closed, and to accelerate the closing action of the piston elements 21 and 22.

The flaring of the inner ends of flow passages 34 reduces the resistance offered to the flow of fluid through this portion of the flow passage. The external ends of passages 34 are formed square and the fluid will encounter more resistance in flowing through the square ends of passages 34 than when flowing through the flared ends because of the greater turbulence set up by these square edges. Thus when a shock is encountered and one of the valve elements is forced against the other the fluid in gap 33 will be squeezed out through the flared openings of passages 34 at a much greater rate than fluid will tend to enter the gap 33 through the square ends of passages 34. This effect, as will be understood from principles of hydraulic flow, is more pronounced as the velocity of the flow is increased so that while the fluid can be exhausted from the gap quite readily through the flared openings the ability of fluid to enter is to a large extent prohibited by the increased resistance of the square ends of the flow passages 34. In this manner a more instantaneous closing of the valve elements is accomplished. While the operation of the flared openings has been discussed with reference to flow passages 34 it is evident that the same result obtains in the case of passages 36 and 37 of Figures 7 and 9 respectively.

The undercutting or relieving of the juxtaposed faces of the valves as shown in Figures 7 to 10 inclusive serves a twofold purpose. First, it reduces the resistance offered to the flow of fluid through the valve element. It is a well known principle of hydraulics that as the volume of a flow passage increases, the velocity of flow of a fluid through the passage decreases. Another principle is that as the velocity of a fluid flow decreases, the resistance decreases. Therefore as the undercutting of the faces enlarges the volume of the flow passage through gap 33, the velocity of fluid flow between the valve elements i. e., through gap 33 is decreased. This decrease in velocity of flow through the gap further reduces the resistance offered to the flow of fluid from the gap when a shock is encountered. Second, the undercutting reduces the area of contact between the valve elements when they are forced against each other under the influence of a shock. It is seen then that the entire hydrostatic pressure built up against the exposed side of a valve element under a shock is distributed over the abutting or contacting area of the valve elements. The total area thus in contact between the elements is much less than the total exposed area of the valve element and therefore the unit pressure on the contacting surface is much greater than on the exposed surface. This is a desirable result in that it provides a better seal between the seated valve element.

The equal spacing of the apertures or flow passages about the discs provide a uniform distance of oil travel through any one passage from one side of the piston to the other through the opposed discs. It is readily apparent that the resistance to the flow of the oil through these apertures or flow passages is greatly reduced because the distance from one aperture to the next is such that the oil flows a uniform distance.

Again referring to Fig. 4 of the drawing, it will be apparent that the normal or slow movements of the piston elements through the oil in cylinder 6 in response to normal steering action of the vehicle will produce a minimum resistance of oil through the staggered apertures and the gap 33. However when a shock is encountered that causes a sudden acceleration in the movement of the piston through the cylinder a pressure is built up on the forward side of the piston that overcomes the force of spring 32 and the forward valve element is forced into abutment with the other valve element. Due to the staggered relation of the openings 34 all flow of fluid through the piston is cut off thus preventing further movement of the piston in the cylinder. Relative movement between the stabilizer parts thus being prevented the steering mechanism is momentarily locked in place. The steering mechanism is in this manner maintained in a true course until the diverting force has been overcome.

It is further apparent that by use of the hydraulic hand hereinbefore described, there is no possibility of the wheels or steering mechanism being subjected to a so-called shimmey, and the hazards of the vehicle leaving the road when it strikes a rough or soft shoulder or other obstacle, or when the tire blows out, is entirely prevented.

Thus it is seen that at normal operation, there will be no impedance to the normal steering of the vehicle, but upon sudden acceleration of the tie rod, a tremendous resistance is immediately set up to counteract the accelerating force.

Although several embodiments of the invention have been herein illustrated and described, it will be apparent to those skilled in the art that various modifications may be made in the details of construction without departing from the principles herein set forth.

I claim:

A stabilizer comprising a cylinder, a piston rod movable therein having a piston head including valve means, said valve means comprising movable discs normally held apart by resilient means, and means mounted on said rod and separable therefrom for predetermining the maximum opening of the gap between the discs, said last-mentioned means comprising members having cylindrical portions receiving the rod and forming bearings for the movement of the discs and also having limiting flanges at their ends providing stops for said discs, said cylindrical portions being of a length greater than the thickness of the discs such that when their opposed free ends are in contact a predetermined gap between the disc is maintained in cooperation with said resilient means and said flanges.

GALE H. HEDRICK.